Nov. 28, 1961 N. E. RISK 3,010,530
RESILIENT MEANS FOR FRONT END TRACTOR SUSPENSION
Filed July 1, 1959 2 Sheets-Sheet 1
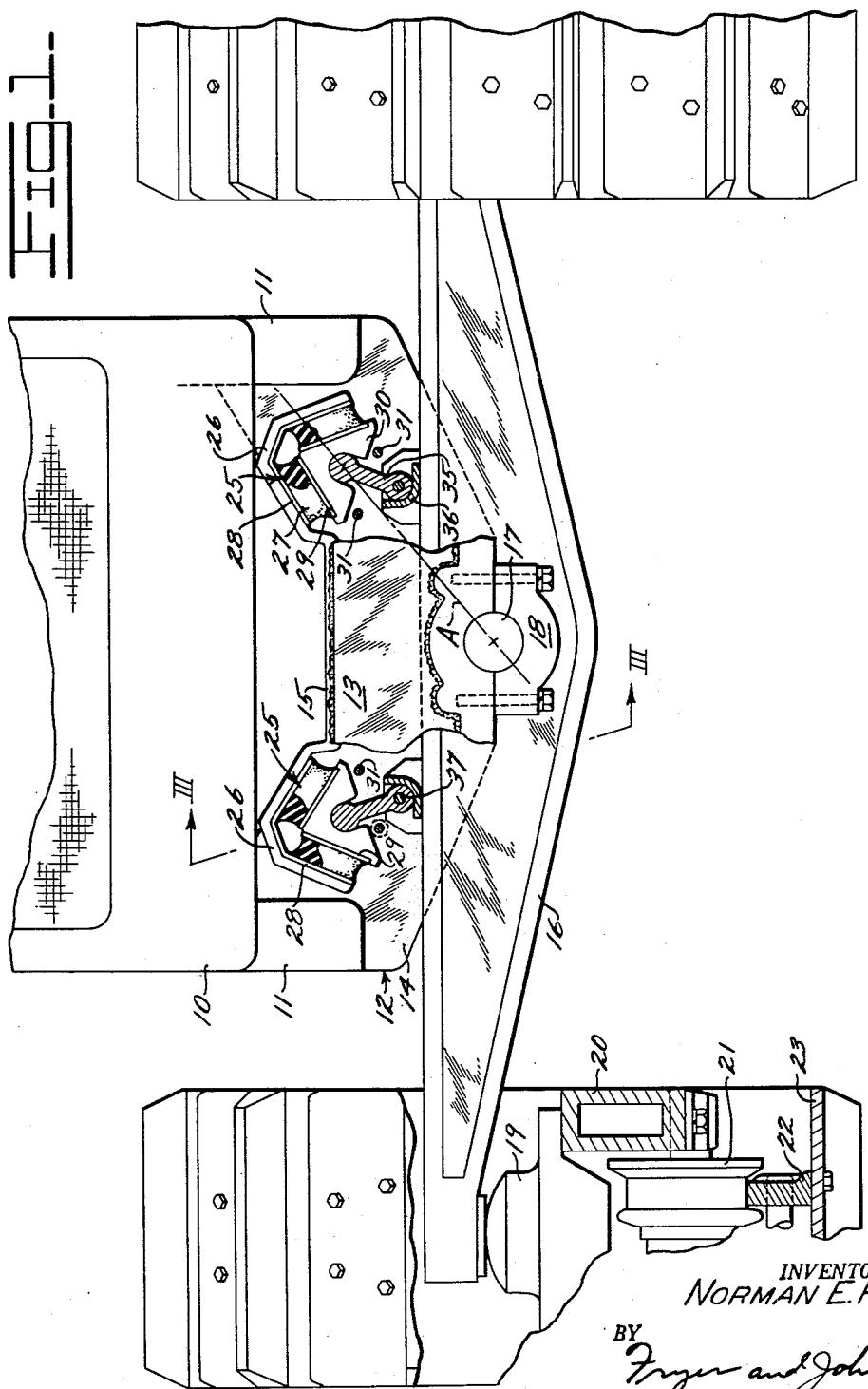
INVENTOR.
NORMAN E. RISK
BY
ATTORNEYS

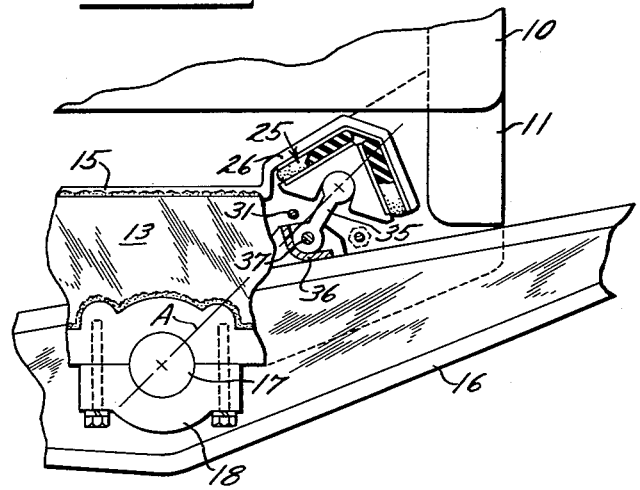
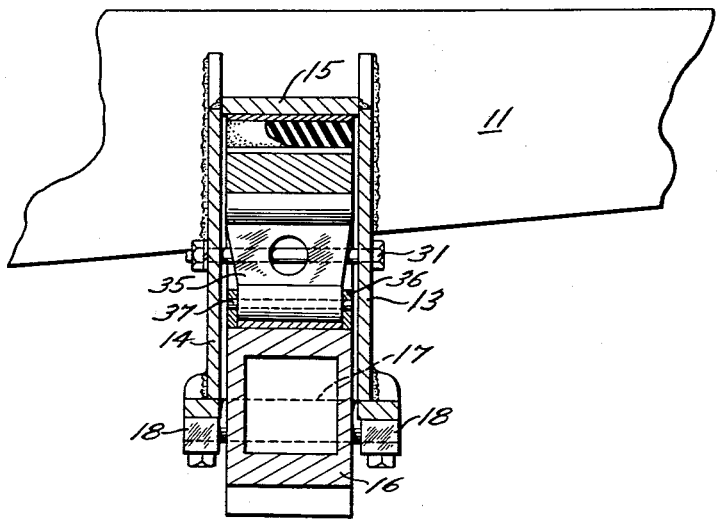

United States Patent Office 3,010,530
Patented Nov. 28, 1961

3,010,530
RESILIENT MEANS FOR FRONT END TRACTOR SUSPENSION
Norman E. Risk, Peoria, Ill., assignor to Caterpillar Tractor Co., Peoria, Ill., a corporation of California
Filed July 1, 1959, Ser. No. 824,330
3 Claims. (Cl. 180—9.54)

This invention relates to improvements in the front end suspension for track-type tractors or the like and particularly to improvements in the resilient or cushioning means used in association with the equalizer bar which supports the weight of the front end of the tractor between the forward ends of the truck frame.

Most conventional track-type tractors comprise a main frame supporting a power unit and transmission mechanism and truck frames spaced on opposite sides of the main frame and carrying endless track assemblies. The truck frames are pivotally connected adjacent their rear ends to the main frame through sprocket shafts which carry sprockets for driving the endless tracks. This connection is usually non-resilient but it permits oscillation of the truck frames or pivotal movement about the common axis of the sprocket shafts so that the forward ends of the truck frames can swing upwardly independently of each other as the tractor travels over uneven terrain. The forward end of the main frame is supported on a transverse member extending between the truck frames and this transverse member, usually referred to as an equalizer bar, has a pivotal or rocking connection with respect to the longitudinal center line of the main frame and rests upon suitable pads on the truck frames at its opposite ends so that it is free for rocking motion upon raising or lowering of either truck frame and its track assembly with respect to the other, thus enabling the tracks to oscillate. Either one track or the other can pass over an obstacle or a high point in the ground with a minimum of tipping or tilting of the tractor which shifts its center of gravity to one side or the other with a resultant tendency to lift the track entirely free of the ground thus losing traction or in extreme cases causing the entire machine to roll over.

It is common practice to provide some resilient means in the form of springs or the like between the equalizer bar and the tractor main frame on opposite sides of the pivotal connection between them to cushion the oscillating motion of the equalizer bar referred to. Since the force exerted by ordinary spring means increases in proportion to its distortion, the resistance to oscillation of the equalizer bar increases with the magnitude of its oscillatory movement and the tendency of the tractor to tip or for its track to leave the ground is proportionately increased.

It is the object of the present invention to provide resilient or cushioning means for use between the equalizer bar and the main frame of the tractor designed to provide a substantially constant rate resilient means opposing oscillatory movement of the equalizer bar and thus maintain the maximum resistance of the track to leave the ground as the degree of oscillation of the bar increases. The manner of accomplishing the foregoing and more specific objects and advantages of the invention are made apparent in the following specification wherein reference is made to the accompanying drawings.

In the drawings:

FIG. 1 is a fragmentary view in front elevation of a tractor with its front end suspension constructed in accordance with the present invention and with parts broken away to disclose structural details;

FIG. 2 is a fragmentary view in front elevation like Fig. 1 showing the equalizer bar and cushioning means in the position assumed during oscillation of the bar; and FIG. 3 is a fragmentary sectional view taken on the line III—III of FIG. 1.

A portion of the front end of the tractor is shown at 10 in FIG. 1 of the drawings as supported on a pair of main longitudinal frame members 11. The longitudinal frame members are connected adjacent their forward ends by a transverse frame member, generally indicated at 12 and including as also shown in FIG. 3 a front plate 13, only a portion of which is illustrated in FIG. 1, a back plate 14 and a top plate 15, all suitably secured to each other and to the longitudinal frame members 11 as by welding.

An equalizer bar 16 supports the transverse member 12 and the forward end of the tractor through a pivot pin 17 journaled in bearings including bearing caps 18 provided at the lower edges of the plates 13 and 14 and extending through a suitable opening in the equalizer bar. The equalizer bar is supported at its outer ends by pads 19, one of which is shown in FIG. 1, the support being such that it slides laterally on the pads during rocking motion caused by raising or lowering of the truck frames, one of which is shown at 20. Conventional track rollers, such as indicated at 21, roll on the usual endless track 22 which is made up of articulated members connected with track shoes 23.

In order to afford resistance to oscillation of the equalizer bar 16 about its pivot 17, inverted V-shaped rubber cushion devices, generally indicated at 25, are disposed beneath the top plate 15 of the transverse frame member which is formed as at 26 to a shape for receiving these devices. Each of the cushions 25 comprises two pads of rubber-like material 27 bonded or otherwise suitably secured to wear plates 28 and 29. A triangular seat or thrust pad 30 is disposed in the V portion of the cushion members and is retained in place therein by bolts 31 which, as shown in FIG. 3, extend through the front and back plate 13 and 14 of the transverse frame member. A strut 35 with cylindrically contoured upper and lower edges is disposed between a suitable socket in the thrust pad 30 and a curved bracket 36 secured to the top of the equalizer bar. A pivot pin 37 retains the strut in the socket 36 and permits it to swing about the axis of the pivot pin.

When either end of the equalizer bar moves upwardly as a result of upward movement of the truck frame which supports it, the condition obtains which is illustrated in FIG. 2 showing one end of the equalizer bar swung upwardly to its limit which is defined by contact with the main frame member 11. In this position, the equalizer bar has, through the strut 35, compressed the cushion device 25, the function of which is to resiliently resist this upward swinging movement. Because of the shape and relative positions of the parts described, this resilient resistance is compensated by leverage so that it is in effect of constant value rather than increasing with the magnitude of the movement of the equalizer bar. This can best be understood from a comparison of FIGS. 1 and 2 wherein reference lines A have been drawn through the centers of the pivot pin 17 and the upper cylindrical end of the strut 35. This comparison shows that, because the lower end of the strut is disposed inwardly of the upper end or inclined toward the pivot pin 17, raising of one side of the equalizer bar and compression of the unit 25 is accompanied by movement of its lower end and pin 37 therein toward the reference line A which is the center line between the pivot 17 and the upper pivotal axis of the strut 35.

As seen in FIG. 1 of the drawings, the distance between the lower end of the strut 35 and line A is greater than the distance between the same points in FIG. 2. Thus the moment arm effective in compressing or distorting the cushion means decreases as the equalized bar swings upwardly. Since the moment arm decreases and the compressive force developed in the cushion device increases from the FIG. 1 position to the FIG. 2 position, the force resisting movement of the bar is in effect substantially constant rather than progressively increasing. Therefore, the tendency of the track on the high side to leave the ground is considerably reduced.

I claim:

1. In a tractor front end suspension wherein an equalizer bar is centrally pivoted with respect to the tractor main frame and its outer ends are supported by the truck frames, resilient means on and disposed beneath the tractor main frame at each side of the center and linkage including a strut disposed between and articulately supported with relation to the equalizer bar and each resilient means, each said strut being arranged with its inner end inclined inwardly toward the center of the equalizer bar whereby upon upward movement of either end of the bar the corresponding strut will effect compression of the resilient means with a moment arm decreasing in proportion to the magnitude of movement of the equalizer bar and to approximately half its original length when the equalizer bar is pivoted to its extreme position.

2. In a tractor front end suspension wherein an equalizer bar is centrally pivoted with respect to the tractor main frame and its outer ends are supported by the truck frames, a cushion of resilient material supported by the tractor frame above and on each side of the central pivotal connection and disposed within the width of the frame, a strut between each cushion and the equalizer bar, means providing pivotal thrust connections between each strut and its points of connection with the equalizer bar and the cushion, said struts being inclined inwardly whereby upon upward movement of either end of the equalizer bar the lower end of the strut on that end will swing inwardly with respect to its upper end, and decrease the moment arm through which compression is exerted upon the cushion to approximately half its original length when the equalizer bar is pivoted to its extreme position.

3. In a tractor front end suspension wherein an equalizer bar is centrally pivoted with respect to the tractor main frame and its outer ends are supported by the truck frames, a cushion of resilient material supported by the tractor frame above and on each side of the central pivotal connection and disposed within the width of the frame, a strut between each cushion and the equalizer bar, means providing pivotal thrust connections between each strut and its points of connection with the equalizer bar and the cushion, said struts being inclined inwardly whereby upon upward movement of either end of the equalizer bar the lower end of the strut on that end will swing inwardly with respect to its upper end, and decrease the moment arm through which compresison is exerted upon the cushion.

References Cited in the file of this patent

UNITED STATES PATENTS

| | | |
|---|---|---|
| 2,013,994 | Schutte | Sept. 10, 1935 |
| 2,074,962 | Jersey | Mar. 23, 1937 |

FOREIGN PATENTS

| | | |
|---|---|---|
| 904,958 | France | Mar. 26, 1945 |